United States Patent
Suarez et al.

(10) Patent No.: US 8,146,262 B1
(45) Date of Patent: Apr. 3, 2012

(54) METHOD AND DEVICE FOR LOCATING HOLE CENTER

(75) Inventors: John F Suarez, Mission Viejo, CA (US); Daniel W Campbell, Riverside, CA (US)

(73) Assignee: The Boeing Company, Chicago, IL (US)

(*) Notice: Subject to any disclaimer, the term of this patent is extended or adjusted under 35 U.S.C. 154(b) by 343 days.

(21) Appl. No.: 12/582,923

(22) Filed: Oct. 21, 2009

(51) Int. Cl.
*G01B 2/25* (2006.01)
(52) U.S. Cl. .......................................... 33/644; 33/613
(58) Field of Classification Search ............. 33/644, 33/613
See application file for complete search history.

(56) References Cited

U.S. PATENT DOCUMENTS

| | | | |
|---|---|---|---|
| 1,878,296 A * | 9/1932 | Schmidt et al. ............... 33/644 |
| 4,164,076 A * | 8/1979 | Carrigan ...................... 33/644 |
| 4,363,173 A | 12/1982 | Caldera |
| 4,969,889 A | 11/1990 | Greig |
| 5,046,262 A * | 9/1991 | Kerbaugh ..................... 33/644 |
| 5,729,906 A | 3/1998 | Banks et al. |
| 6,178,654 B1 * | 1/2001 | Kanatake ...................... 33/645 |
| 6,383,208 B1 | 5/2002 | Sancoff et al. |
| 6,409,437 B1 | 6/2002 | Metzger |
| 6,508,011 B1 | 1/2003 | Lee |
| 6,881,017 B1 | 4/2005 | Krecek et al. |
| 6,907,675 B1 | 6/2005 | Hutchings |
| 6,922,906 B2 * | 8/2005 | Choi et al. ................... 33/613 |
| 6,927,560 B2 | 8/2005 | Pedigo et al. |
| 7,016,052 B2 | 3/2006 | Bloch et al. |
| 7,162,810 B2 * | 1/2007 | Biggs et al. .................. 33/645 |
| 7,353,609 B2 | 4/2008 | Hollingshead et al. |
| 7,363,721 B2 | 4/2008 | Nappier |
| 7,467,479 B2 * | 12/2008 | Guzik et al. .................. 33/613 |
| 7,470,889 B2 * | 12/2008 | Jones et al. ................. 33/1 PT |
| 7,836,603 B2 * | 11/2010 | Guzik et al. .................. 33/613 |
| 7,836,604 B2 * | 11/2010 | Paharik et al. ................ 33/613 |
| 7,836,605 B2 * | 11/2010 | Guzik et al. .................. 33/613 |
| 2007/0009323 A1 * | 1/2007 | Jones et al. ................. 33/1 PT |
| 2009/0113738 A1 * | 5/2009 | Guzik et al. .................. 33/645 |
| 2010/0257747 A1 * | 10/2010 | Guzik et al. .................. 33/645 |

* cited by examiner

*Primary Examiner* — Yaritza Guadalupe-McCall
(74) *Attorney, Agent, or Firm* — Hanley, Flight & Zimmerman, LLC.

(57) ABSTRACT

A device locates an apparatus to the center of a hole in a structure. The device includes a hub adapted to have the apparatus mounted thereon and a plurality of locator elements spaced around the hub which extend at least partially into the hole. Means coupled with the locator elements and the hub are used to displace the locator elements outwardly into engagement with the edges of the structure and to move the hub into axial alignment with the center of the hole.

20 Claims, 7 Drawing Sheets

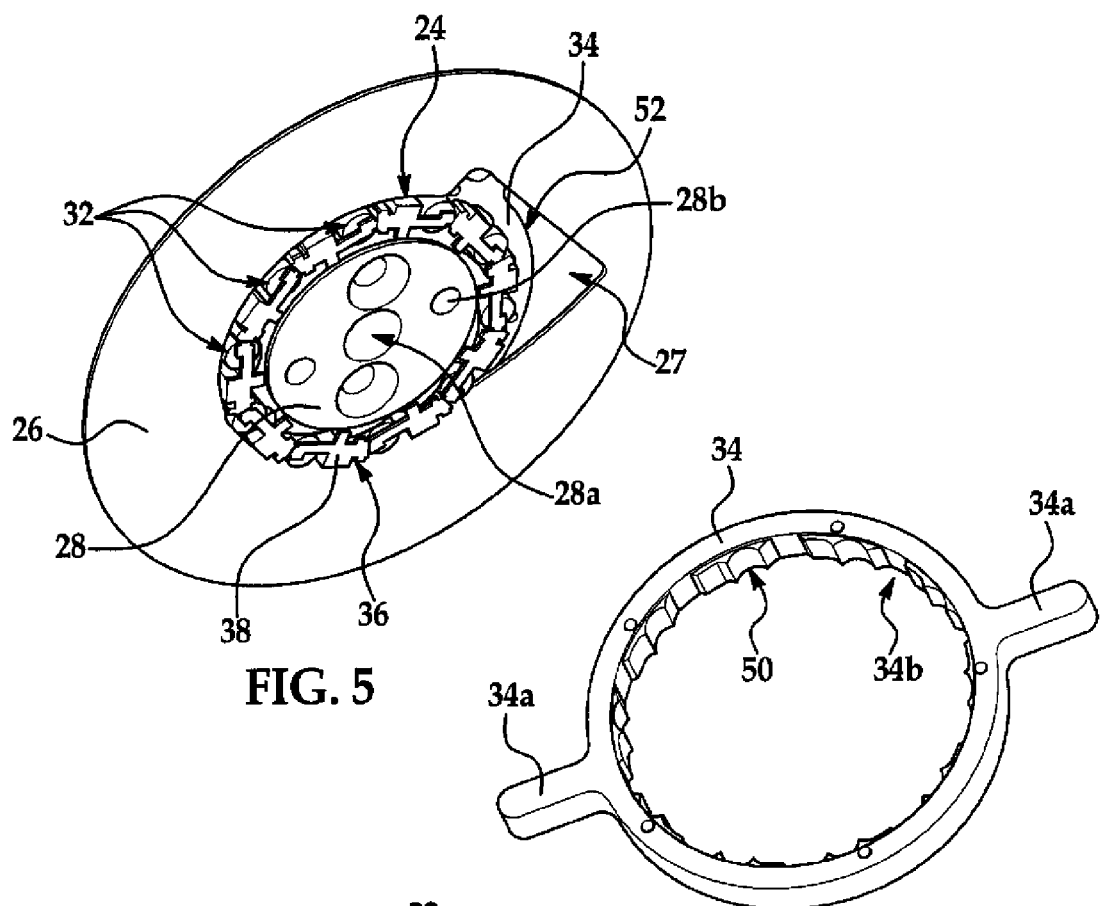
FIG. 5
FIG. 6
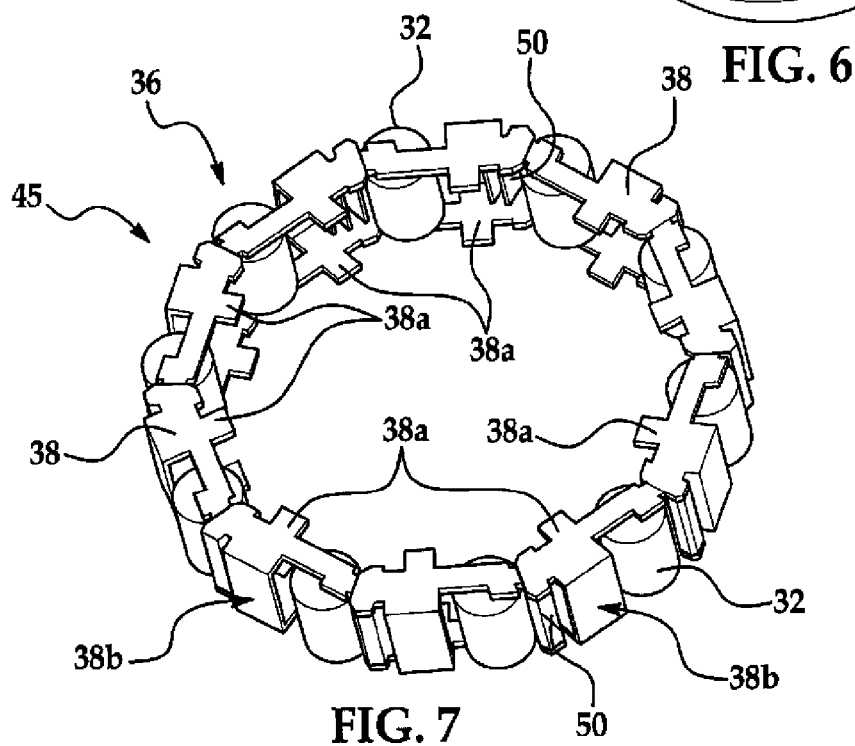
FIG. 7

METHOD AND DEVICE FOR LOCATING HOLE CENTER

TECHNICAL FIELD

This disclosure generally relates to tool fixtures, and deals more particularly with a method and device for locating a tool to the center of a workpiece hole.

BACKGROUND

It is sometimes necessary to locate a working axis of a tool such as an inspection device or a drill at the center of the hole in a workpiece. In a production environment it may be necessary to accurately locate the hole center in each of a series of substantially identical parts in order to take into account slight differences in hole sizes due to manufacturing tolerances.

Devices exist for locating the center of a hole, but each may have disadvantages. For example, an expanding mandrel may be used to locate a hole center, however expandable mandrels sometimes remain in their expanded position after repeated use and may require rework in order to render them suitable for reuse. Other available centering devices may provide inconsistent results in locating the center of the same sized holes in substantially identical parts, while other devices may be too large or bulky for some applications.

Accordingly, there is a need for a method and device for locating apparatus such as a tool to the center of a hole which is relatively simple, rapid, accurate and provides consistent results.

SUMMARY

The disclosed embodiments provide a method and device for locating apparatus to the center of a hole that provide consistent results and is easy to use. When placed over a hole and actuated, the device self-adjusts to locate an axis of the apparatus to the center of the hole. The device is relatively simple in construction and may permit a wide range of equipment or apparatus such as inspection equipment or drills to be mounted directly on the device so as to locate and hold the equipment at the center of the hole while a machining, inspection or similar operation is performed.

According to one disclosed embodiment, a device is provided for locating an apparatus to the center of a hole in a structure. The device includes a hub adapted to have the apparatus mounted thereon and a plurality of locator elements spaced around the hub and extending at least partially into the hole. Means are provided for displacing the locator elements outwardly into engagement with the edges of the structure and for moving the hub into axial alignment with the center of the hole. The hub may include a plurality of ramps engaging the locator elements and spaced around the periphery thereof. The displacing means may include springs that move the locator elements respectively along the ramps, thereby camming the locator elements outwardly into engagement with the structure.

According to another disclosed embodiment, a device is provided for locating an apparatus to a center of a hole in a structure. The device includes a hub having a centerline and is adapted to have the apparatus mounted thereon. A ring surrounds the hub and is adapted to be placed on the structure, overlying the hole. The device further includes an expandable locator assembly mounted between the hub and the ring which includes locator elements extending into the hole. The locator elements are biased to expand into engagement with the structure to move the hub and bring the centerline of the hub into substantial alignment with the centerline of the hole. Rotation of the ring relative to the hub draws the locator elements inwardly away from the structure, allowing the device to be removed from the structure after use.

According to another embodiment, a method is provided of locating an apparatus to a center of a hole in a structure. The method includes placing the apparatus on a hub having a centerline and positioning the hub over the hole. Locator elements are placed in the hole, and are then expanded outwardly into engagement with the edges of the structure surrounding the hole. Expansion of the locator elements into engagement with the edges of the structure is used to move the hub to the center of the hole and bring the hub centerline into alignment with the hole center.

The disclosed embodiments satisfy the need for a method and device for locating apparatus to the center of a hole which is relatively simple, provides consistent, repeatable results and is easy to use.

BRIEF DESCRIPTION OF THE ILLUSTRATIONS

FIG. 5 is an illustration of the bottom side of the structure shown in FIG. 4 and depicting the device having been placed on the structure and displaced to locate to the hole center.

FIG. 6 is an illustration of an isometric view of the ring forming part of the device of FIGS. 2 and 3.

FIG. 7 is an illustration of an isometric view of the roller sprague forming part of the device shown in FIGS. 2 and 3.

DETAILED DESCRIPTION

Figure 1:
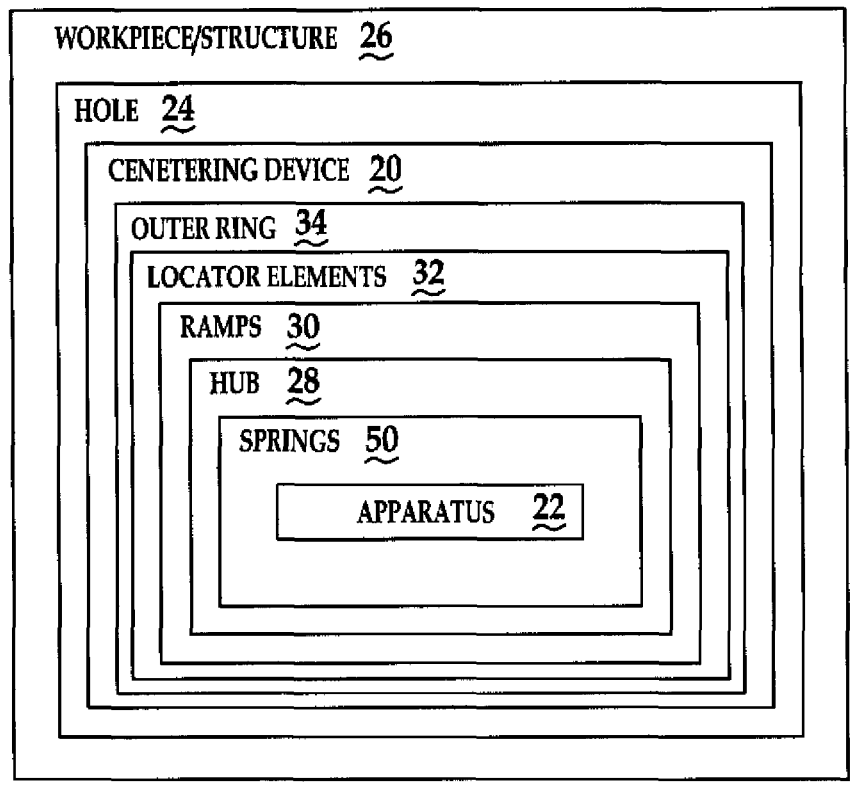
FIG. 1 is an illustration of a functional block diagram of a device for locating the center of the hole.

Referring first to FIG. 1, the disclosed embodiments generally relate to a centering device 20 that may be used to locate an apparatus 22 to the center (not shown) of a hole 24 in a workpiece 26. The centering device 20 includes a hub 28 upon which the apparatus 22 may be mounted. The hub 28 includes a plurality of ramps 30 on the outer periphery thereof. Locator elements 32 bear against ramps 30 and are cammed outwardly into engagement with the workpiece 26 by springs 50. The outward displacement of the locator elements 32 into engagement with the workpiece 26 moves the hub 28 to locate the apparatus 22 at the center (not shown) of the hole 24. Rotation of an outer ring 34 forming part of the device 20 overcomes the force of the springs 50 to retract the locator elements 32 and allow removal of the device 20 from the structure after a centering operation has been performed.

Figure 2:
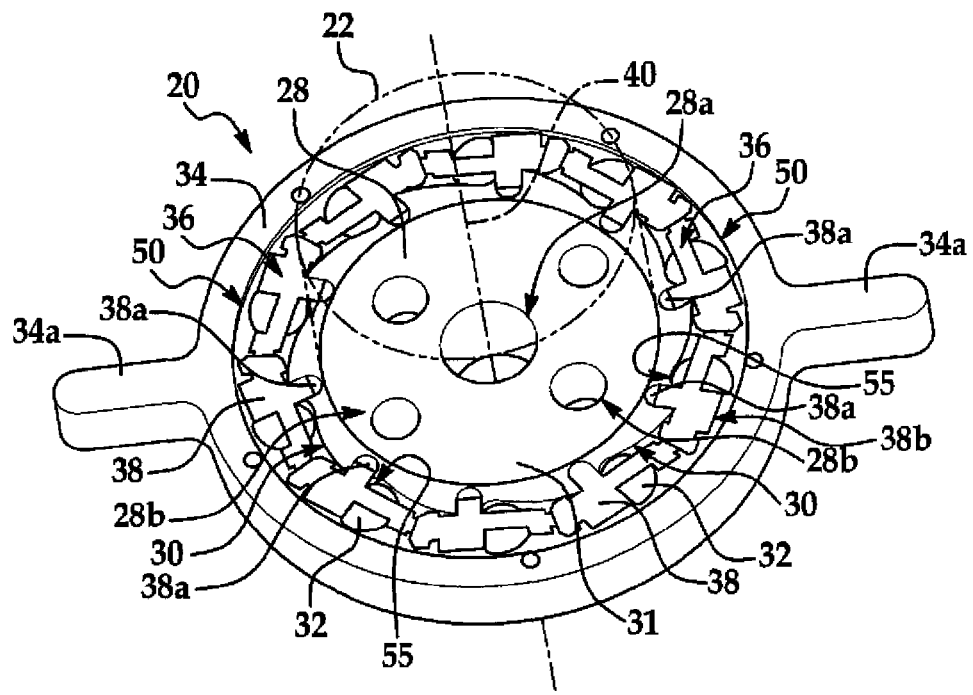
FIG. 2 is an illustration of an isometric view showing the top side of one embodiment of the device, the position of an apparatus that may be mounted on the device being shown in the phantom.
Figure 3:
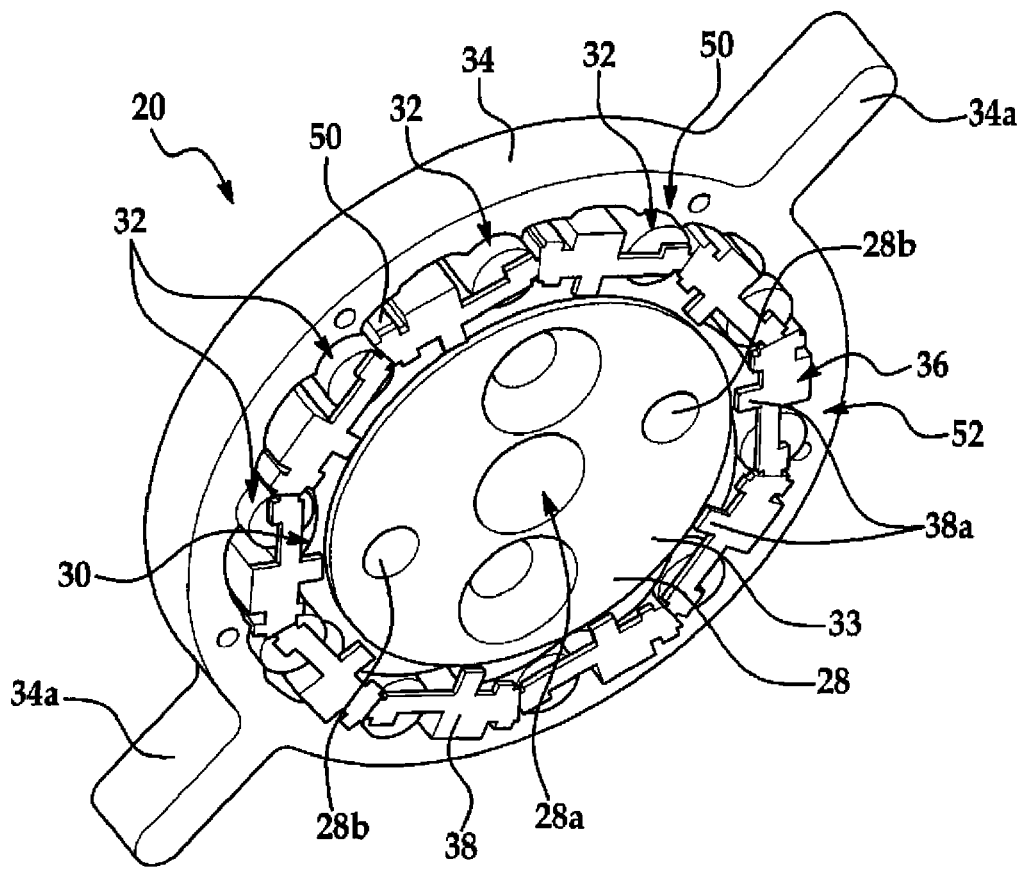
FIG. 3 is an illustration of an isometric view of the bottom side of the device shown in FIG. 2.

Referring now also to FIGS. 2-8, the device 20 broadly includes an outer, circular ring 34, a central hub and a roller sprague 36 forming an expandable locator assembly 45 (FIG. 7) that couples the ring 34 with the hub 28. As best seen in FIGS. 2, 3 and 6, the ring 34 includes a pair of diametrically opposed handles 34a which may be used to rotate the ring 34 relative to the hub 28 and retract the locator assembly 45, as will be described below in more detail. Interior wall 34b of the ring 34 includes a plurality of arcuately shaped pockets 50. Although not shown in the drawings, a ring shaped cover may be secured to the ring 34 in order to protectively cover the roller sprague 36 and assist in holding the assembled internal parts together.

Figure 8:
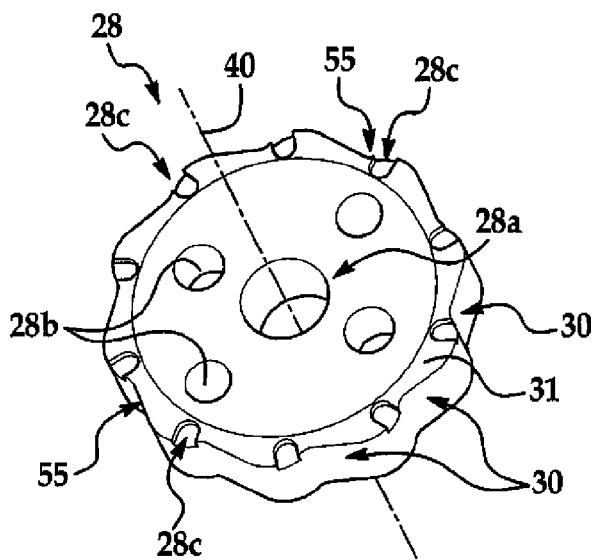
FIG. 8 is an illustration of an isometric view of the hub forming part of the device shown in FIGS. 2 and 3.

As best seen in FIG. 8, the hub 28 includes a central cylindrical opening 28a therein which is concentric with both the central axis 40 of the hub 28 and the ring 34. The hub 28 may also include any number of through holes 28b that may be used to mount an apparatus 22 (see FIG. 2) on the hub 28 in order to locate the apparatus 22 to the central axis 40 of the hub 28. As used throughout this description, "axis" and "centerline" will be used interchangeably. In the illustrated example, the hole 24 may possess one or more irregularities 27 but includes edges 26b that define a generally circular opening 24, the center of which is designated by the numeral 24a and may sometimes also be referred to herein as centerline 24a.

Returning now to FIG. 8, the hub 28 includes a plurality of ramp surfaces 30 arranged essentially end-to-end around the periphery of the hub 28. The ramp surfaces 30 are concentric about the central axis 40 of the hub 28. The upper and lower faces 31, 33 (see FIGS. 2 and 3) include a plurality of circumferentially spaced recesses 28c immediately adjacent the ramp surfaces 30, as shown in FIG. 8.

The ring 34 and hub 28 may be formed of any suitable materials using a variety of known manufacturing techniques. Generally, the ring 34 and hub 28 may be formed of rigid materials such as metal or composites.

Figure 4:
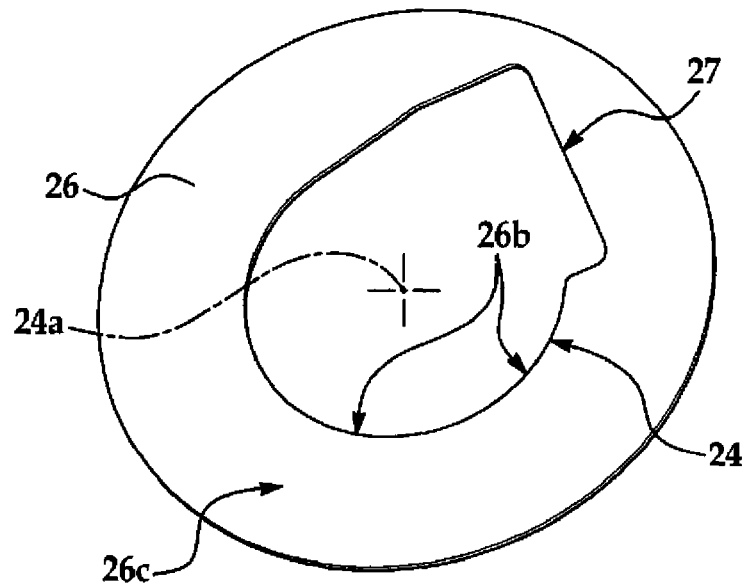
FIG. 4 is an illustration of an isometric view of a structure having a hole whose center may be located by the device shown in FIGS. 2 and 3.

Referring particularly to FIG. 7, as previously mentioned, the roller sprague 36 forms an expandable locator assembly 45 comprising a plurality of cage sections 38, a plurality of the locator elements 32 and a plurality of springs 50 respectively within the cage sections 38. The cage sections 38 are arranged in end-to-end relationship to each other forming a circular configuration. Each of the cage sections 38 is generally U-shaped in cross section and includes a pair of fingers 38a which are adapted to be received within the recesses 28c in the hub 28 (see FIG. 8). In one embodiment, the cage sections 38 may be separate from each other, while in other embodiments, they may be joined together at their ends. A plurality of the locator elements 32 are respectively movably disposed within the cage sections 38 and are biased toward one end of the cage sections 38 by means of the springs 50 which are generally Z-shaped in cross section. The cage sections 38 may be formed of any suitable material, such as metal. The cage sections 38 function to retain and guide the movement of the locator elements 32 along the ramp surfaces 30. In the illustrated example, the locator elements 32 are generally cylindrical and may be hereinafter sometimes referred to as rollers 32. As best seen in FIGS. 3 and 5, the rollers 32 extend down below the bottom face 52 of the ring 34, and into the hole 24 when the device 20 is placed on the top surface 26c of the structure 26 (FIG. 4).

Referring particularly to FIGS. 2 and 3, the cage segments 36 are supported on the hub 28 by the fingers 38a. Each of the rollers 32 bears against a corresponding ramp surface 30 as well an arcuate pocket 50 in the ring 34. As shown in FIGS. 2, 3 and 7, the springs 50 bear against the rollers 32 and bias the rollers 32 to move toward the upper end of the ramp surfaces 30, corresponding to a counter-clockwise direction as viewed in FIG. 2. The biasing influence exerted by the springs 50 is transferred through the rollers 32 to the ring 34 which reacts the spring force. Thus, the springs 50 normally bias the rollers 32 to move up the ramp surfaces 30, thereby caroming the rollers 32 radially outward. However, a sufficient rotational force applied to the ring 34 in a clockwise-direction (as viewed in FIG. 2) overcomes the biasing force of the springs 50, causing the ring 34 to rotate relative to the hub 28 and forcing the rollers 32 to move down the ramp surfaces 30. As the rollers 32 move down the ramp surfaces 30, the rollers 32 cam inwardly and retract toward the centerline of the hub 28.

Figure 9:
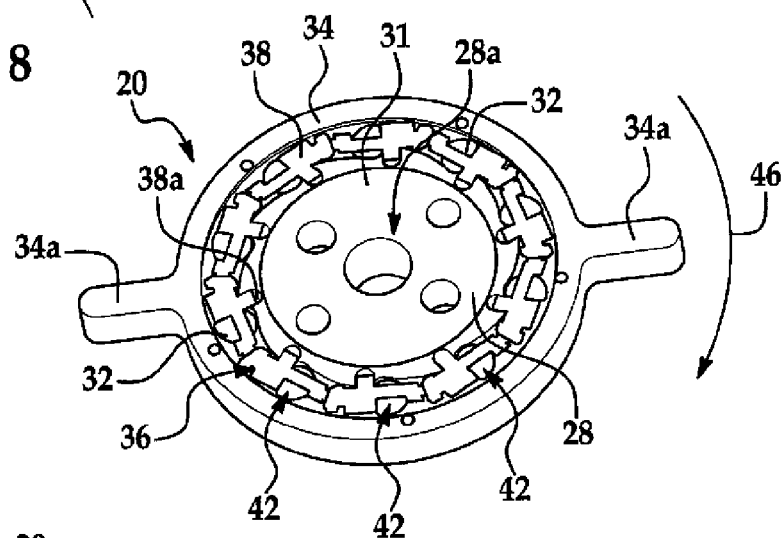
FIG. 9 is an illustration of an isometric view of the device in its retracted position.
Figure 10:
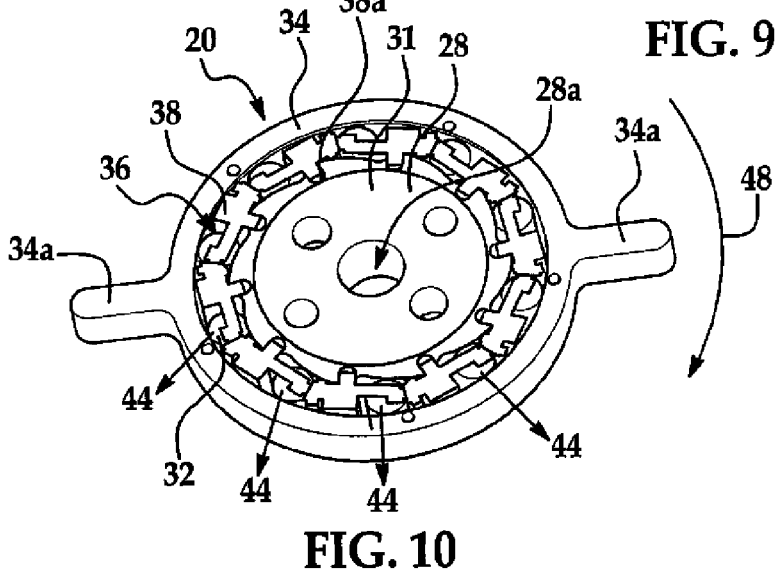
FIG. 10 is an illustration similar to FIG. 9, but showing the device in its expanded position.

Referring now to FIGS. 4, 5, 9 and 10, in use, the ring is 34 first rotated relative to the hub 28 by moving the arms 34a clockwise (FIG. 2), causing the rollers 32 to move to their retracted positions. During this rotation of the ring 34, the hub 28 is restrained against rotation either by directly holding the hub 28 or by placing a key or similar wrench (not shown) into one or more openings in the hub 28, such as the through holes 28b in order to restrain the hub 28 against rotation as the ring 34 is rotated. With the rollers 32 retracted, the device 20 may then be placed on the surface 26c (FIG. 4) of a structure 26 with the rollers 32 extending through the opening 24. Next, the rotational force may be removed from the ring 34, thereby releasing the hub 28 and ring 34 to rotate relative to the ring 34 under the biasing influence exerted by the springs 50. As the ring 34 is released, the springs 50 cause the rollers 32 move up the corresponding ramp surfaces 30. Because the ramp surfaces 30 are inclined relative to a tangent (not shown) around the periphery of the hub 28, the rollers 32 move radially outward in a camming action, in unison with each other. FIG. 10 illustrates the fully expanded state of the device 20 in which the rollers 32 have been displaced to the upper end of the ramp surfaces 30.

Figure 11:
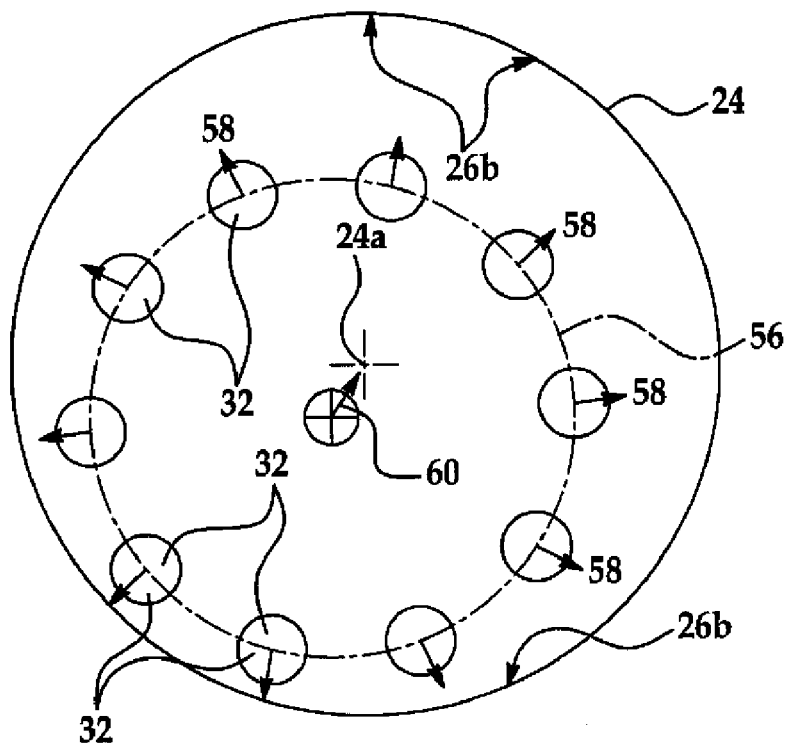
FIGS. 11 and 12 are illustrations of diagrams useful in explaining the movement of the locator elements.
Figure 13:
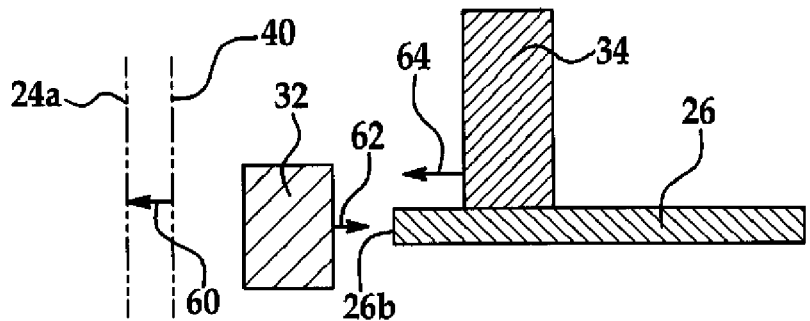
FIGS. 13 and 14 are illustrations of diagrams showing movement of the locator elements into engagement with the structure and shifting of the device to align the centerline of the device with the hole center.

Attention is now directed to FIGS. 11 and 13 which illustrate the retracted position of the rollers 32, when the ring 34 has been initially rotated while the hub 28 is retrained, thereby reading the device 20 for a centering operation. The rollers 32 are regularly spaced around a circle 56 which expands and contracts with the camming action produced by rotation of the ring 34 relative to the hub 28. The outward displacement of the rollers 32 is indicated by the arrows 58 in FIG. 11 resulting from the camming action produced by the biasing force of the springs 50. During this camming action, the rollers 32 expand outwardly until one or more of the rollers 32 engage inside edges 26b of the structure 26 which surround the hole 24. The structure 24 reacts the force applied by the rollers 32 which have contacted the edges 26b so that continued outward displacement of the rollers 32 causes the hub 28, and thus the entire device 20 to be displaced toward the center 24a of the hole 24. FIG. 11 illustrates the centerline 40 of the hub 28 being displaced in the direction shown by the arrow 60 until it is aligned with the center 24a of the hole 24.

Figure 12:
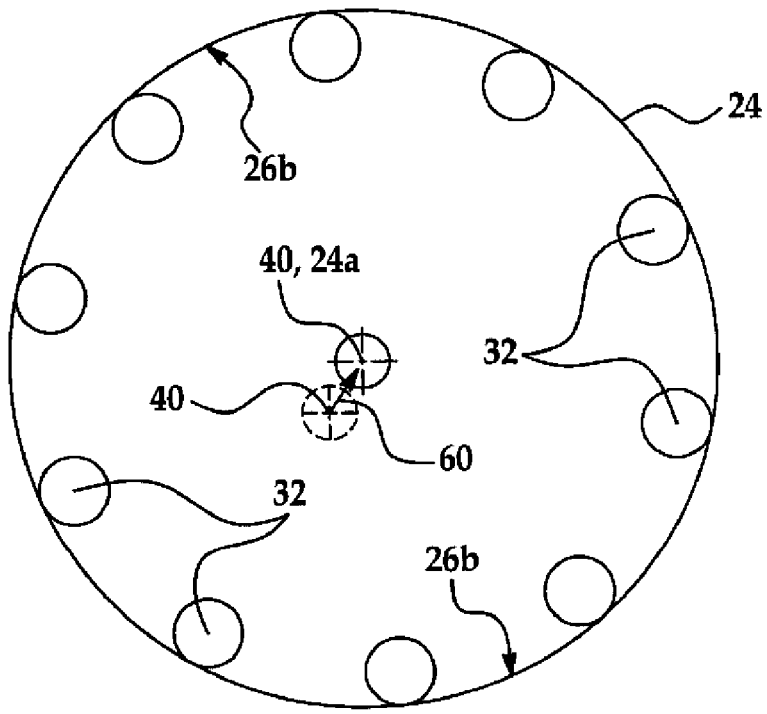
Figure 14:
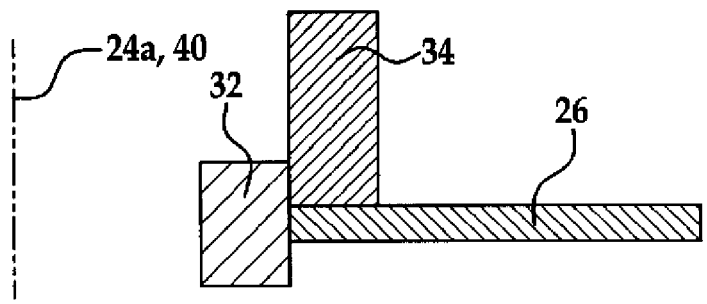

FIGS. 12 and 14 illustrate the position of the rollers 32 when they have been fully expanded and brought into contact with the edges 26b of the structure 26, causing displacement of the centerline 40 of the hub 28. As can be seen in these two figures, the centerline 40 of the hub 28 has been brought into alignment with the center 24a of the hole 24, such that the centerline 40 of the hub 28 is substantially coaxial with the centerline 24a of the hole 24.

Figure 15:
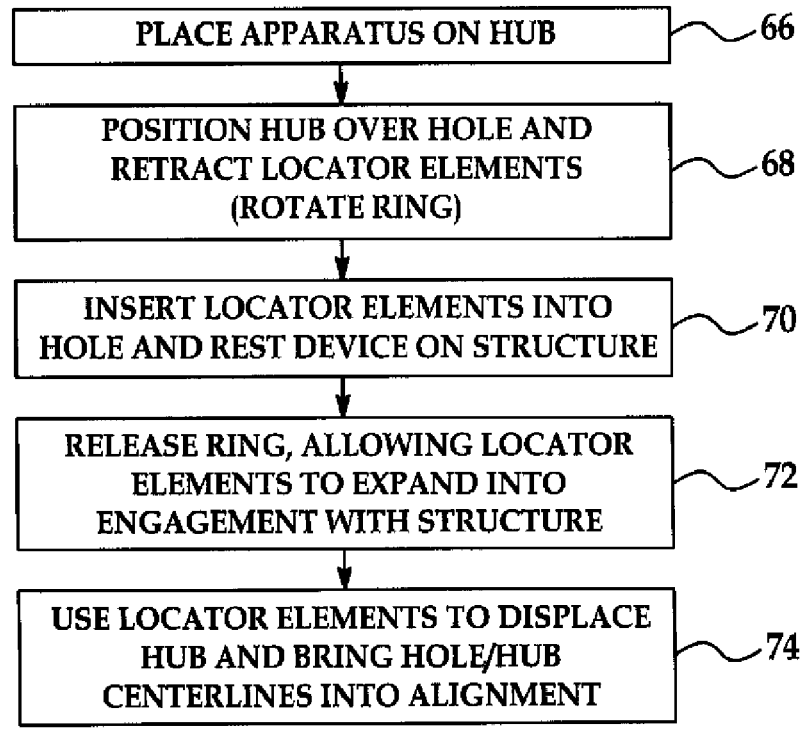
FIG. 15 is an illustration of a flow diagram showing the steps of a method of locating apparatus to the center of a hole.

Attention is now directed to FIG. 15 which illustrates the overall steps of a method of locating an apparatus 22 to the center 24a of a structure 26. Beginning at 66, a desired apparatus 22 is placed or mounted on the hub 28 such that a working axis or centerline (not shown) on the apparatus 22 is aligned with the centerline 40 of the hub 28. Next, at 68, the hub 28 is positioned over the hole 24, and the locator elements 32 are retracted inwardly by rotating the ring 34 relative to the hub 28. With the locator elements 32 retracted, they may be inserted into the hole 24 and the device 20 may be rested on the surface 26c of the structure 26, as shown at 70. Then, at 72, the ring 34 is released, allowing the springs 50 expand the locator elements 32 until they move into engagement with the structure 24. Finally, as shown at step 74, the locator elements 32 are used to displace the hub 28 and bring the centers 24a, 40 of the hole 24 and hub 28, respectively into alignment with each other.

After the apparatus 22 has completed a locating operation, the ring 34 (FIG. 2) is rotated in a clockwise direction 46 shown in FIG. 9 relative to the hub 28, thereby overcoming the biasing influence of the springs 50 (FIG. 3) and causing the rollers 32 to retract inwardly so as to clear the edges 26b of the structure 26. With the rollers 32 clear of the edges 26b, the device 20 may be removed from the structure 26.

Figure 16:
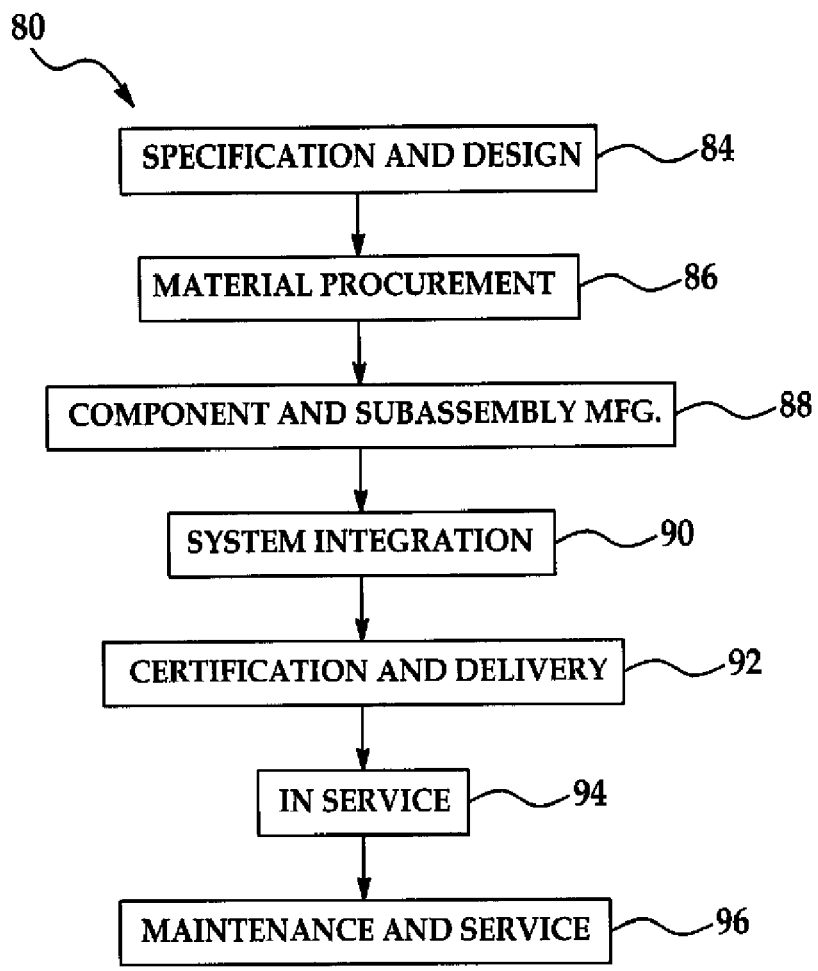
FIG. 16 is an illustration of a flow diagram of aircraft production and service methodology.
Figure 17:
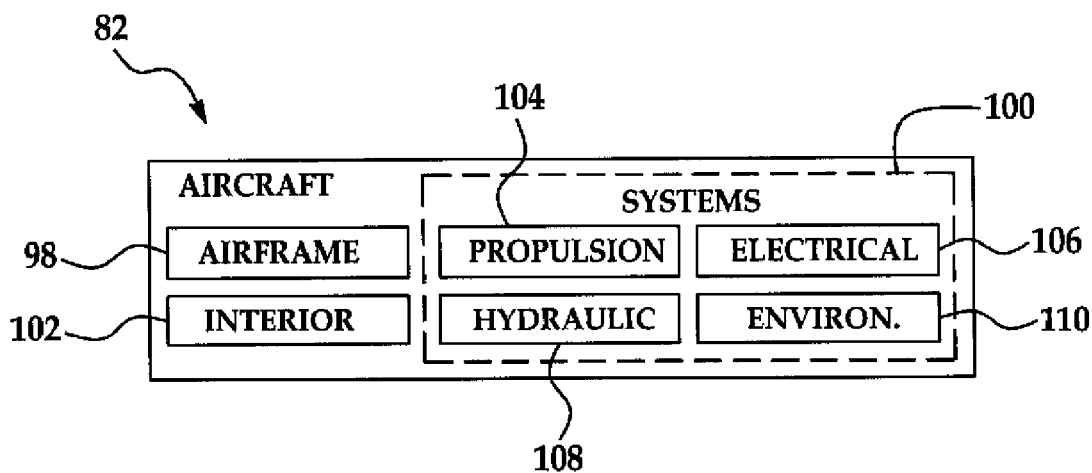
FIG. 17 is an illustration of a block diagram of an aircraft.

Embodiments of the disclosure may find use in a variety of potential applications, particularly in the transportation industry, including for example, aerospace, marine and automotive applications. Thus, referring now to FIGS. 16 and 17, embodiments of the disclosure may be used in the context of an aircraft manufacturing and service method 80 as shown in FIG. 16 and an aircraft 82 as shown in FIG. 17. During pre-production, exemplary method 80 may include specification and design 84 of the aircraft 82 and material procurement 86. During production, component and subassembly manufacturing 88 and system integration 90 of the aircraft 82 takes place. The disclosed device 20 may be used to locate various tools and fixtures to the centers of holes formed in components and subassemblies during these production processes. Thereafter, the aircraft 82 may go through certification and delivery 92 in order to be placed in service 94. While in service by a customer, the aircraft 82 is scheduled for routine maintenance and service 96 (which may also include modification, reconfiguration, refurbishment, and so on). The disclosed method may be used to locate equipment to hole centerlines on components that are installed during the maintenance and service 96.

Each of the processes of method 80 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 82 produced by exemplary method 80 may include an airframe 98 with a plurality of systems 100 and an interior 102. The disclosed device may be used to locate equipment to hole centerlines on parts which form part of, or may be installed on the airframe 98. Examples of high-level systems 100 include one or more of a propulsion system 104, an electrical system 106, a hydraulic system 108, and an environmental system 110. Any number of other systems may be included. Although an aerospace example is shown, the principles of the disclosure may be applied to other industries, such as the marine and automotive industries.

The disclosed device and method may be employed to locate equipment to hole center of parts during any one or more of the stages of the production and service method 80. Also, one or more method embodiments, or a combination thereof may be utilized during the production stages 88 and 90, for example, by substantially expediting assembly of or reducing the cost of an aircraft 82. Similarly, the disclosed device and method may be used to locate equipment to the center of a hole in a part that are utilized while the aircraft 82 is in service 94.

Although the embodiments of this disclosure have been described with respect to certain exemplary embodiments, it is to be understood that the specific embodiments are for purposes of illustration and not limitation, as other variations will occur to those of skill in the art.

What is claimed:

1. A device for locating an apparatus to a center of a hole in a structure, comprising:
a hub adapted to have the apparatus mounted thereon;
a plurality of locator elements spaced around the hub and extending at least partially into the hole; and,
means coupled with the locator elements and the hub for displacing the locator elements outwardly into engagement with the edges of the structure and for moving the hub into substantial alignment with the center of the hole.

2. The device of claim 1, wherein:
the hub includes a plurality of ramp surfaces engaging the locator elements and spaced around the periphery of the hub, and
the displacing means includes a plurality of springs for biasing the locator elements to move respectively move along the ramp surfaces.

3. The device of claim 2, wherein each of the locator elements is a roller.

4. The device of claim 2, wherein the ring includes a plurality of pockets in the periphery thereof for respectively retaining the locator elements therein.

5. The device of claim 4, further comprising a plurality of cages between the hub and the ring for retaining the locator elements and for guiding the movement of the locator elements along the ramp surfaces.

6. The device of claim 2, wherein the hub and the ring are substantially concentric.

7. The device of claim 2, wherein the locator elements are arranged at regularly spaced intervals around a circle.

8. The device of claim 2, wherein the locator elements are arranged at regularly spaced intervals around a circle.

9. A device for locating an apparatus to a center of a hole in a structure, comprising:
a hub having a centerline and adapted to have the apparatus mounted thereon;
a ring surrounding the hub and adapted to be placed on the structure overlying the hole; and,
an expandable locator assembly mounted between the hub and the ring and including locator elements extending into the hole, the locator elements being expandable into engagement with the structure to move the hub and bring the centerline of the hub into substantial alignment with the center of the hole.

10. The device of claim 9, wherein:
the ring is rotatable relative to the hub, the expandable locator assembly includes a plurality of springs, and the locator elements are coupled with and driven to expand by the springs.

11. The device of claim 9, wherein the expandable locator assembly includes a roller sprague.

12. The device of claim 9, wherein:

the hub includes a plurality of ramp surfaces around the periphery thereof, and the locator elements respectively bear against and are movable along the ramp surfaces.

13. The device of claim 12, wherein the expandable locator assembly includes a plurality of guides between the hub and the ring for guiding the movement of the locator elements along the ramps.

14. The device of claim 9, wherein the hub and the ring are substantially concentric.

15. A method of locating an apparatus to a center of a hole in a structure, comprising:

placing the apparatus on a hub;

positioning the hub over the hole;

placing locator elements in the hole;

expanding the locator elements outwardly into engagement with edges of the structure surrounding the hole; and, using the expansion of the locator elements to move the hub to the center of the hole and bring the center of the hub into substantial alignment with the center of the hole.

16. The method of claim 15, wherein expanding the locator elements includes camming the elements outwardly from the hub by moving the locator elements along ramped surfaces on the hub.

17. The method of claim 15, wherein expanding the locator elements includes using springs to bias the locator elements outwardly from the hub and into engagement with the structure.

18. The method of claim 15, wherein expanding the locator elements includes using a spring bias to cam the locator elements outwardly along ramp surfaces.

19. A method of locating an apparatus to a center of a hole in a structure, comprising:

mounting the apparatus on a hub having a centerline;

placing a ring on the structure surrounding the hole;

using the ring to support the hub over the hole;

placing locator elements in the hole, including retracting a set of locator elements inwardly by rotating the ring relative to the hub;

expanding the locator elements outwardly into engagement with the of the structure surrounding the hole, including— using spring bias to cam the locator elements outwardly along ramped surfaces on the hub; and using the expansion of the locator elements to move the hub and bring the hub centerline into alignment with the center of the hole.

20. A device for locating an apparatus to a center of a hole in a structure, comprising:

a generally round hub having a central opening therethrough and a plurality of ramped surfaces spaced around the periphery thereof, the ramped surfaces being concentric about the central opening, the hub further including a plurality of circumferentially spaced recesses therein around the periphery thereof;

a ring adapted to be placed on the structure and surrounding the hub, the ring being rotatable relative to the hub and supporting the hub over the hole, the ring including a plurality of circumferentially spaced pockets therein; and a roller sprague assembly mounted between the ring and the hub, the sprague assembly including— a plurality of cage segments arranged end-to-end in a circle, each of the cage segments having fingers respectively received in the recesses in the hub for retaining the cage segments on the hub, a roller within each of the cage segments, each of the rollers being held in one of the pockets and bearing against one of the ramp surfaces, and a spring associated with each of the rollers for biasing the roller to move in one direction along one of the ramp surfaces, the biasing force applied by the springs causing the rollers to cam outwardly along the ramp surfaces into engagement with the structure and move the centerline of the hub opening into substantial axial alignment with the center of the hole.

* * * * *